United States Patent
Foster

(10) Patent No.: US 8,215,297 B2
(45) Date of Patent: Jul. 10, 2012

(54) FOLDING SIDE TABLE

(75) Inventor: Robert James Foster, Rogersville, TN (US)

(73) Assignee: Meco Corporation, Greeneville, TN (US)

( * ) Notice: Subject to any disclaimer, the term of this patent is extended or adjusted under 35 U.S.C. 154(b) by 102 days.

(21) Appl. No.: 12/770,214

(22) Filed: Apr. 29, 2010

(65) Prior Publication Data

US 2010/0275906 A1 Nov. 4, 2010

Related U.S. Application Data

(60) Provisional application No. 61/174,167, filed on Apr. 30, 2009.

(51) Int. Cl.
*A47J 37/07* (2006.01)
(52) U.S. Cl. .......................................... 126/9 R; 126/9 B
(58) Field of Classification Search ................ 126/41 R, 126/40, 39 R, 9 B, 9 R; 108/42, 47, 152
See application file for complete search history.

(56) References Cited

U.S. PATENT DOCUMENTS

| 4,337,751 | A |   | 7/1982  | Sampson |
|-----------|---|---|---------|---------|
| 4,688,541 | A |   | 8/1987  | Stephen |
| 5,471,916 | A | * | 12/1995 | Bird et al. ................... 99/446 |
| 5,906,193 | A |   | 5/1999  | Leach |
| 2007/0246034 | A1 |  | 10/2007 | Demars |
| 2009/0044728 | A1 |  | 2/2009  | Tourounjian |

FOREIGN PATENT DOCUMENTS

WO     WO 2004-054416 A1    7/2004

OTHER PUBLICATIONS

International Search Report and Written Opinion mailed Dec. 6, 2010 in connection with PCT/US2010/032963.

\* cited by examiner

*Primary Examiner* — Alfred Basichas
(74) *Attorney, Agent, or Firm* — McGuireWoods LLP

(57) ABSTRACT

A folding table for a grill includes a table portion configured to extend into an operative position and configured to be placed in a protective stowed position to protect the grill. The folding table further includes an upper cross support pivotally connected to the table portion and an attachment portion configured to be connected to the grill. The attachment portion is pivotally connected to the support.

9 Claims, 3 Drawing Sheets

FOLDING SIDE TABLE

CROSS-REFERENCE TO RELATED APPLICATIONS

This application claims priority under 35 U.S.C. §119(e) to provisional U.S. Patent Application No. 61/174,167, filed on Apr. 30, 2009, the disclosure of which is expressly incorporated by reference herein in its entirety.

BACKGROUND OF THE INVENTION

1. Field of the Invention

The invention is directed to a table, and in particular, a table for use in locations where a preparation or other surface is desired such as next to a grill.

2. Related Art

Many devices, such as grills have various side tables that include obstructive support mechanisms and that are not easily folded into a usable arrangement/stowed arrangement position. Moreover, such tables do not have secondary functionality such as locking a grill or other mechanism in a closed position and/or providing a level of protection for the same.

Accordingly, there is a need for a support table that is easily placed into the operative stowed position, does not have obstructive support mechanisms, has secondary uses such as locking a grill in the closed position and being positioned such as to protect a grill's upper surface.

SUMMARY OF THE INVENTION

The invention meets the foregoing need and allows a support table that is easily supported on a grill or the like may be easily rearranged to protect the top of the grill and lock the grill, which results in a significant improvements in the ability to create a food preparation surface, lock a grill in the closed position, cover the upper surface of a grill and other advantages apparent from the discussion herein.

According to another aspect of the invention a folding table includes a table portion configured to extend into an operative position and configured to be placed in a protective stowed position. The folding table further includes a handle extending from the table portion, an upper cross support pivotally connected through the handle, and an attachment portion configured to be connected to a device. The attachment portion being pivotally connected to the support.

Accordingly, in one aspect of the invention a folding table for a grill includes a table portion configured to extend into an operative position and configured to be placed in a protective stowed position to protect the grill. The folding table further includes an upper cross support pivotally connected to the table portion and an attachment portion configured to be connected to the grill. The attachment portion being pivotally connected to the support.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
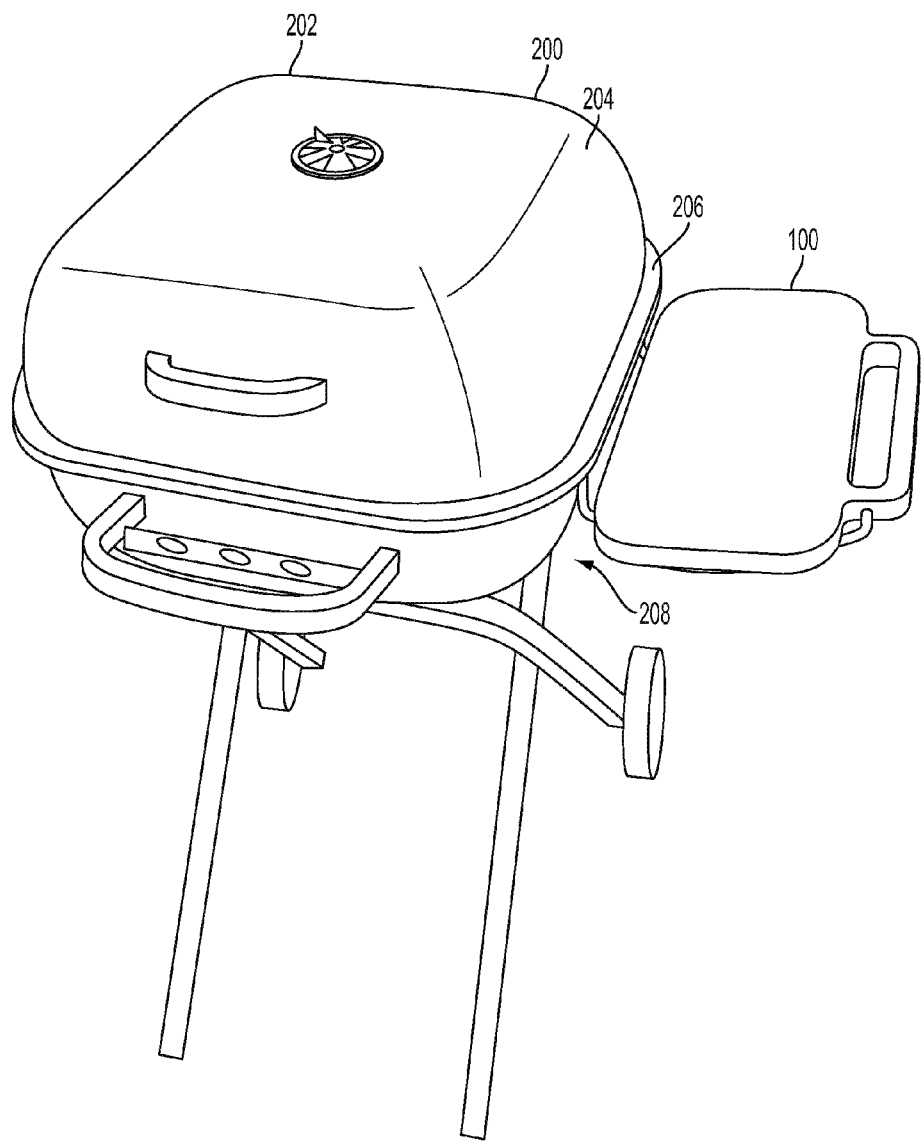
FIG. 1 shows a folding table in the operative position attached to a grill constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

In FIG. 1 the folding table 100 may be arranged along side a device such as a grill 200. As further shown in FIG. 1 the table 100 is in the operative position extending horizontally from the grill 200. Of course, the folding table 100 may be attached to any sort of mechanism or other horizontal surface including kitchen islands, recreational vehicles (RV), boats, and the like. Grill 200 may also include a vent 202, a lid 204 to close the grill, and a lid edge 206 which cooperates with the lower part of the grill 208.

Figure 2:
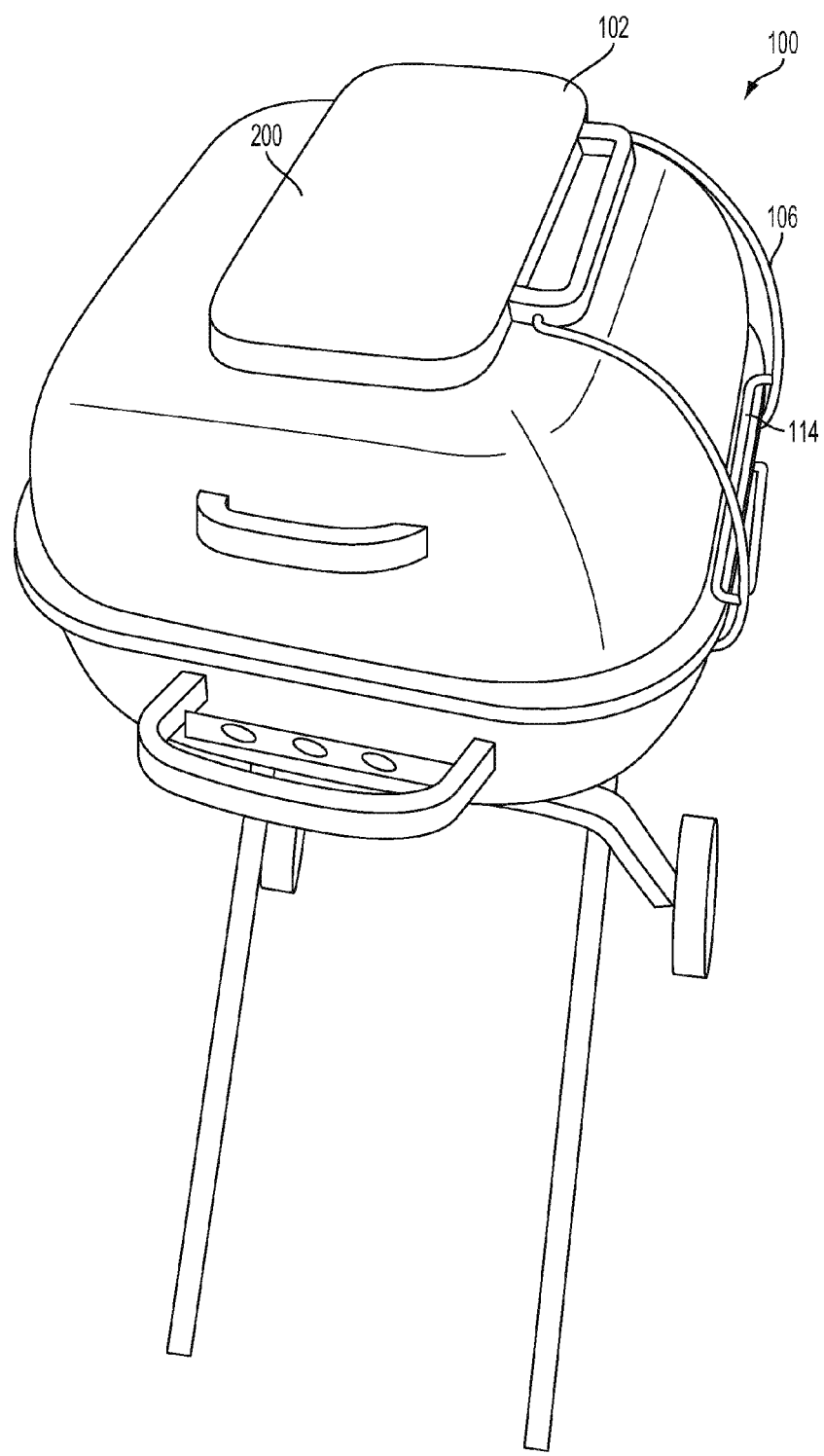
FIG. 2 shows a folding table in the stowed position constructed according to the principles of the invention.

In particular as shown in FIG. 2, the table 100 is shown in the stowed position. In the stowed position the table portion extends up above the grill 200 covering the vent 202 and protecting the upper lid 204 surface of the grill 200. A support 106 extends up from the horizontal surface of the grill 200 in order to place the table portion 102 in the position shown in FIG. 2. A cross-support 114, described later in detail, is shown holding an edge 206 of the grill lid 204 in place and keeping it from opening when the grill 200 is stowed.

Figure 3:
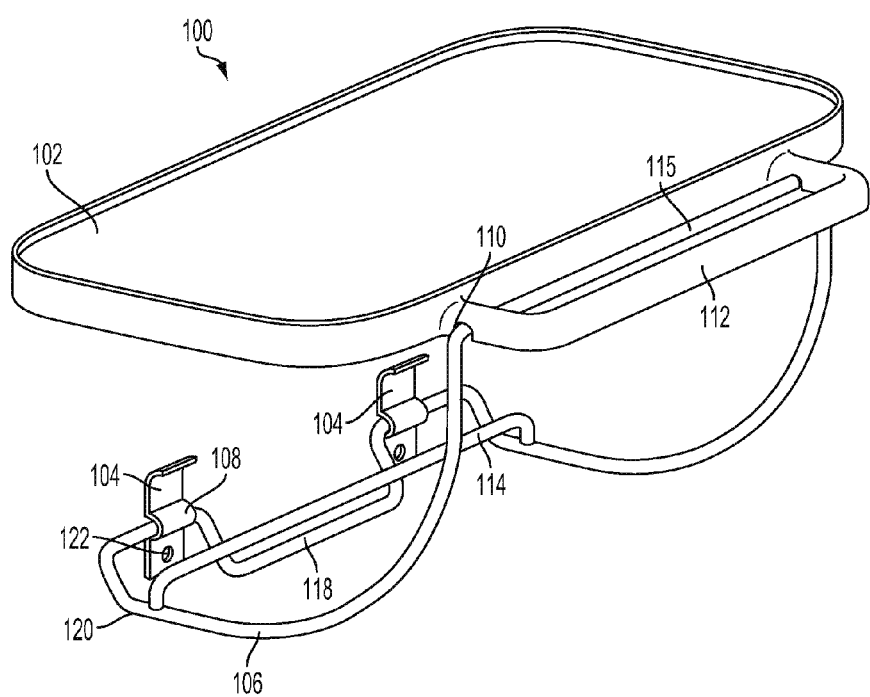
FIG. 3 shows a detailed view of the folding table between the operative position and the stowed position constructed according to the principles of the invention.

As shown in FIG. 3, the folding table 100 may include a table portion 102. The table portion 102 may take any shape and be formed of any known materials. As shown in FIG. 3, the table portion 102 may be implemented as a generally rectangle shape having curved corners. Additionally, the table portion 102 as shown in FIG. 3 may have a vertically extending edge which that may keep items on the surface of table portion 102 from rolling off or additionally any sort of liquid spillage from pouring off the top surface portion of table portion 102. Additionally, table portion 102 may be constructed of synthetic materials including various types of plastic, metals, or a combination thereof. For example, the table portion 102 may be formed through a molding process from synthetic materials.

The folding table 100 may further include a handle 112 attached to the table portion 102. The handle 112 may be integrally molded with the table portion of 102. Alternatively, the handle 112 may be mechanically attached to table portion 102 through adhesives or other types of mechanical fasteners. The handle portion 112 may include pivot structure to allow for connection to a support 106. Additionally or alternatively, the support 106 may be pivotally attached to the table portion 102.

The support 106 may be constructed of metal. For example, the support structure 106 may be constructed of a metal rod bent in the fashion shown in FIG. 3 through a known bending process. Thereafter, the support 106 may be finished using various coating processes to reduce corrosion thereof. Alternatively, the support 106 may be formed of metallic materials that do not require a corrosion resistant surface material in order to avoid having to provide the same. The support 106 may include two support portions.

The support 106 may also be attached to a horizontal or near horizontal surface through attachment brackets 104. The attachment brackets 104 may be formed of metallic or other materials and include some form of mechanical attachment. The mechanical attachment may include mechanical fasteners extending through attachment holes 122 for holding the attachment brackets 104 against a vertical or near vertical support surface. The attachment brackets 104 may also include support pivot connections 108 to the bracket 104. The support connections 108 may be implemented as a bend in the attachment brackets 104 or may be implemented through some other mechanical connection between support 106 and attachment brackets 104.

The support 106 functions to support the table portion 102 in a horizontal or near horizontal position. In that regard, the support 106 may be connected at the support pivot connection 110 and also at the support pivot connection 108 and may provide vertical support to the table portion 102 in order to keep table portion 102 in a horizontal configuration. In this regard, the table portion 102 may be supported on one end by the support pivot connection 110 through handle 112 or alternatively pivot connection on table portion 102 and additionally the support 106 may support table portion 102 through a contact against support surface 120 or against cross support 114. Again, the result is table portion 102 that may be held in a horizontal position through the contact of the table against support surface 120 or cross support 114 of support 106 and the upward force of support 106 through handle 112.

A support 106 may also include an upper cross support 116. The upper cross support 116 may provide strength and rigidity to the support 106. Additionally, the upper cross support 116 may also function as a way in which to hang tools or other cooking implements to the table portion 102. Additionally, handle 112 may also act as a way in which to hang tools and other cooking implements along side of the table portion 102 for one who is using the table portion 100 along side a grill.

The support 106 may also include a lower cross support 118. The lower cross support 118 provides additional rigidity to support 106 and also may contact the lower surface of the grill 208. The support 106 further may include a cross support 114. The cross support 114 may provide additional rigidity to the support 106. Additionally, cross support 114 may also support table portion 102 thereunder and support table portion 102 in addition to support surface 120. When the folding table 100 is moved to the stowed position as shown in FIG. 2, the cross support 114 may engage the lower edge of the grill lid 204 thereby closing and holding closed the lid 204.

In accordance to the features described above, the folding table 100 provides a stable horizontal work surface for grilling or other types of uses. The cross support 106 allows for the folding table 100 to be placed in a stowed position located above the operative position to provide protection and covering for a device, such as a grill 200 as shown in FIG. 2. Moreover, the cross supports, including cross support 114 and lower cross support 118 provide the ability to lock and maintain closed a grill lid 204.

Again, although as shown in FIGS. 1 and 2, the folding table 100 may be very well suited for use with a grill, but other uses as noted above are also contemplated by the invention.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A folding table comprising:
   a table portion configured to extend into an operative position and configured to be placed in a protective stowed position;
   a handle extending from the table portion;
   an upper cross support pivotally connected through the handle; and
   an attachment portion configured to be connected to a device, the attachment portion being pivotally connected to the support.

2. The folding table according to claim 1 wherein the device comprises a grill, wherein the operative position of the table portion and the stowed position of the table are both substantially horizontal.

3. The folding table according to claim 1 wherein the attachment portion comprises at least two brackets.

4. The folding table according to claim 3 further comprising a lower cross support that extends between the two brackets.

5. The folding table according to claim 1 further comprising:
   an upper cross support extending through the handle and attached to the support.

6. The folding table according to claim 1 further comprising:
   a lower cross support connected to the support.

7. The folding table according to claim 1 further comprising:
   a third cross support extending between the support.

8. The folding table according to claim 7 wherein the table portion rests on the third support when in the operative position.

9. The folding table according to claim 7 wherein the device comprises a grill and the third support locks a lid of the grill closed when the table portion is in the stowed position.

* * * * *